United States Patent
Stronge et al.

(10) Patent No.: US 10,503,609 B1
(45) Date of Patent: Dec. 10, 2019

(54) REPLICATION LINK SMOOTHING USING HISTORICAL DATA

(71) Applicant: EMC IP Holding Company LLC, Hopkinton, MA (US)

(72) Inventors: William Stronge, Westford, MA (US); David Meiri, Somerville, MA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 278 days.

(21) Appl. No.: 15/499,199

(22) Filed: Apr. 27, 2017

(51) Int. Cl.
*G06F 17/30* (2006.01)
*G06F 11/14* (2006.01)
*G06F 16/27* (2019.01)
*G06F 16/23* (2019.01)

(52) U.S. Cl.
CPC ...... *G06F 11/1464* (2013.01); *G06F 16/2365* (2019.01); *G06F 16/27* (2019.01); *G06F 2201/84* (2013.01)

(58) Field of Classification Search
USPC .......................................................... 709/231
See application file for complete search history.

(56) References Cited

U.S. PATENT DOCUMENTS

| | | | |
|---|---|---|---|
| 6,496,908 B1 | 12/2002 | Kamvysselis et al. | |
| 6,553,464 B1 | 4/2003 | Kamvysselis et al. | |
| 6,640,280 B1 | 10/2003 | Kamvysselis et al. | |
| 6,862,632 B1 | 3/2005 | Halstead et al. | |
| 6,883,018 B1 | 4/2005 | Meiri et al. | |
| 6,886,164 B2 | 4/2005 | Meiri | |
| 6,898,685 B2 | 5/2005 | Meiri et al. | |
| 6,910,075 B2 | 6/2005 | Marshak et al. | |
| 6,938,122 B2 | 8/2005 | Meiri et al. | |
| 6,944,726 B2 | 9/2005 | Yoder et al. | |
| 6,968,369 B2 | 11/2005 | Veprinsky et al. | |
| 6,976,139 B2 | 12/2005 | Halstead et al. | |
| 7,000,086 B2 | 2/2006 | Meiri et al. | |
| 7,024,525 B2 | 4/2006 | Yoder et al. | |
| 7,032,228 B1 | 4/2006 | McGillis et al. | |
| 7,051,176 B2 | 5/2006 | Meiri et al. | |
| 7,054,883 B2 | 5/2006 | Meiri et al. | |
| 7,113,945 B1 | 9/2006 | Moreshet et al. | |
| 7,114,033 B2 | 9/2006 | Longinov et al. | |

(Continued)

FOREIGN PATENT DOCUMENTS

WO   WO 2012/066528 A1   5/2012

OTHER PUBLICATIONS

Ex Parte Quayle dated Mar. 5, 2019 for U.S. Appl. No. 15/499,226; 14 Pages.

(Continued)

*Primary Examiner* — Kim T Nguyen
(74) *Attorney, Agent, or Firm* — Daly, Crowley, Mofford & Durkee, LLP

(57) ABSTRACT

A computer program product, system, and method for determining a number of chunks written to a storage volume during a first replication cycle; determining a host write rate based on the number of chunks written to the storage volume during the first replication cycle; estimating a number of chunks written during a second replication cycle; determining a target rate based on the estimated number of chunks written during the second replication cycle; and transmitting chunks written during the second replication cycle at the target rate.

19 Claims, 5 Drawing Sheets

(56) References Cited

U.S. PATENT DOCUMENTS

| | | |
|---|---|---|
| 7,174,423 B2 | 2/2007 | Meiri et al. |
| 7,197,616 B2 | 3/2007 | Meiri et al. |
| 7,228,456 B2 | 6/2007 | Lecrone et al. |
| 7,240,116 B2 | 7/2007 | Marshak et al. |
| 7,292,969 B1 | 11/2007 | Aharoni et al. |
| 7,376,651 B2 | 5/2008 | Moreshet et al. |
| 7,380,082 B2 | 5/2008 | Meiri et al. |
| 7,383,385 B2 | 6/2008 | Meiri et al. |
| 7,383,408 B2 | 6/2008 | Meiri et al. |
| 7,386,668 B2 | 6/2008 | Longinov et al. |
| 7,392,360 B1 | 6/2008 | Aharoni et al. |
| 7,409,470 B2 | 8/2008 | Halstead et al. |
| 7,430,589 B2 | 9/2008 | Veprinsky et al. |
| 7,577,957 B1 | 8/2009 | Kamvysselis et al. |
| 7,613,890 B1 | 11/2009 | Meiri |
| 7,617,372 B1 | 11/2009 | Bjornsson et al. |
| 7,702,871 B1 | 4/2010 | Arnon et al. |
| 7,870,195 B1 | 1/2011 | Meiri |
| 8,046,545 B2 | 10/2011 | Meiri et al. |
| 8,078,813 B2 | 12/2011 | LeCrone et al. |
| 8,332,687 B1 | 12/2012 | Natanzon et al. |
| 8,335,771 B1 | 12/2012 | Natanzon et al. |
| 8,335,899 B1 | 12/2012 | Meiri et al. |
| 8,468,180 B1 | 6/2013 | Meiri et al. |
| 8,578,204 B1 | 11/2013 | Ortenberg et al. |
| 8,600,943 B1 | 12/2013 | Fitzgerald et al. |
| 8,677,087 B2 | 3/2014 | Meiri et al. |
| 8,694,700 B1 | 4/2014 | Natanzon et al. |
| 8,706,959 B1 | 4/2014 | Arnon et al. |
| 8,719,497 B1 | 5/2014 | Don et al. |
| 8,732,124 B1 | 5/2014 | Arnon et al. |
| 8,781,800 B2 * | 7/2014 | Chavda ............ G06F 16/1752 703/2 |
| 8,782,357 B2 | 7/2014 | Halstead et al. |
| 8,812,595 B2 | 8/2014 | Meiri et al. |
| 8,825,964 B1 | 9/2014 | Sopka et al. |
| 8,838,849 B1 | 9/2014 | Meiri et al. |
| 8,862,546 B1 | 10/2014 | Natanzon et al. |
| 8,914,596 B2 | 12/2014 | Lecrone et al. |
| 8,966,211 B1 | 2/2015 | Arnon et al. |
| 8,977,826 B1 | 3/2015 | Meiri et al. |
| 9,002,904 B1 | 4/2015 | Meiri et al. |
| 9,009,437 B1 | 4/2015 | Bjornsson et al. |
| 9,026,492 B1 | 5/2015 | Shorey et al. |
| 9,026,696 B1 | 5/2015 | Natanzon et al. |
| 9,037,816 B1 | 5/2015 | Halstead et al. |
| 9,037,822 B1 | 5/2015 | Meiri et al. |
| 9,100,343 B1 | 8/2015 | Riordan et al. |
| 9,110,693 B1 | 8/2015 | Meiri et al. |
| 9,141,290 B2 | 9/2015 | Hallak et al. |
| 9,304,889 B1 | 4/2016 | Chen et al. |
| 9,323,750 B2 | 4/2016 | Natanzon et al. |
| 9,342,465 B1 | 5/2016 | Meiri |
| 9,378,106 B1 | 6/2016 | Ben-Moshe et al. |
| 9,396,243 B1 | 7/2016 | Halevi et al. |
| 9,418,131 B1 | 8/2016 | Halevi et al. |
| 9,483,355 B1 | 11/2016 | Meiri et al. |
| 9,524,220 B1 | 12/2016 | Veprinsky et al. |
| 9,558,083 B2 | 1/2017 | LeCrone et al. |
| 9,606,739 B1 | 3/2017 | LeCrone et al. |
| 9,606,870 B1 | 3/2017 | Meiri et al. |
| 9,753,663 B1 | 9/2017 | LeCrone et al. |
| 9,959,063 B1 | 5/2018 | Meiri et al. |
| 9,959,073 B1 | 5/2018 | Meiri |
| 10,007,466 B1 | 6/2018 | Meiri et al. |
| 10,025,843 B1 | 7/2018 | Meiri et al. |
| 10,055,161 B1 | 8/2018 | Meiri et al. |
| 10,083,094 B1 | 9/2018 | Thomas et al. |
| 10,095,428 B1 | 10/2018 | Meiri et al. |
| 10,152,527 B1 | 12/2018 | Meiri et al. |
| 2009/0037500 A1 * | 2/2009 | Kirshenbaum ........ G06F 16/137 |
| 2012/0054430 A1 * | 3/2012 | Iwamitsu .............. G06F 1/3221 711/114 |
| 2012/0089572 A1 | 4/2012 | Raichstein et al. |
| 2013/0110793 A1 * | 5/2013 | Chavda ............... G06F 16/1752 707/692 |
| 2013/0173537 A1 | 7/2013 | Wilkinson |
| 2014/0297395 A1 * | 10/2014 | Chao .................. G06Q 30/0201 705/14.41 |
| 2014/0344222 A1 | 11/2014 | Morris et al. |
| 2015/0046646 A1 * | 2/2015 | Elzind ..................... G06F 3/067 711/114 |
| 2018/0024894 A1 | 1/2018 | Naik et al. |
| 2018/0095672 A1 * | 4/2018 | Rueger ................. G06F 3/0608 |

OTHER PUBLICATIONS

U.S. Appl. No. 16/050,247, filed Jul. 31, 2018, Schneider et al.
U.S. Appl. No. 16/177,782, filed Nov. 1, 2018, Hu et al.
U.S. Appl. No. 16/264,825, filed Feb. 1, 2019, Chen et al.
U.S. Appl. No. 16/263,414, filed Jan. 31, 2019, Meiri et al.
U.S. Appl. No. 15/001,789, filed Jan. 20, 2016, Meiri et al.
U.S. Appl. No. 15/076,775, filed Mar. 22, 2016, Chen et al.
U.S. Appl. No. 15/076,946, filed Mar. 22, 2016, Meiri.
U.S. Appl. No. 15/085,188, filed Mar. 30, 2016, Meiri et al.
U.S. Appl. No. 15/499,297, filed Apr. 27, 2017, Kucherov et al.
U.S. Appl. No. 15/499,303, filed Apr. 27, 2017, Kucherov et al.
U.S. Appl. No. 15/499,226, filed Apr. 27, 2017, Meiri et al.
U.S. Appl. No. 15/797,329, filed Oct. 30, 2017, Parasnis et al.
U.S. Appl. No. 15/971,153, filed May 4, 2018, Meiri et al.
U.S. Appl. No. 15/971,310, filed May 4, 2018, Kucherov et al.
U.S. Appl. No. 15/971,325, filed May 4, 2018, Kucherov et al.
U.S. Appl. No. 15/971,445, filed May 4, 2018, Kucherov et al.

* cited by examiner

| Address | Hash |
|---|---|
| 0 | aaa |
| 1 | bbb |
| 2 | ccc |
| 3 | ddd |
| 5 | eee |
| 6 | fff |
| 7 | ggg |

200

| Address | Hash |
|---|---|
| 0 | aaa |
| 2 | ccc |
| 3 | hhh |
| 5 | eee |
| 6 | fff |
| 7 | ggg |
| 8 | iii |
| 9 | ggg |
| 10 | aaa |

REPLICATION LINK SMOOTHING USING HISTORICAL DATA

BACKGROUND

Content-based storage (sometimes referred to as content-addressable storage or CAS) stores data based on its content, providing inherent data deduplication and facilitating in-line data compression, among other benefits. Some existing content-based storage systems may provide data backup and replication capabilities. For example, snapshots of a given storage volume may be made at arbitrary points in time and replicated to a remote system (e.g., another content-based storage system). Consecutive snapshots may be compared to identify which data in the volume changed and, thus, needs to be transmitted to the remote system. Between any two consecutive snapshots, the storage system may process an arbitrary number of I/O writes for the storage volume.

Some storage systems allow a so-called "recovery point objective" (RPO) period to be defined by a storage administrator or other user. An RPO period may specify the maximum targeted time period in which data might be lost (e.g., due to corruption or disk failure). Existing storage systems may automatically generate and replicate snapshots at some frequency determined by the RPO.

SUMMARY

It is appreciated herein that an amount of data that needs to be transmitted during each replication cycle is generally unknown, whereas the targeted maximum length of a replication cycle may be user-defined. For example, a user that defines a 30 second RPO period would like to have all the data transmitted inside this window. It is further appreciated that transmitting data from a storage system may consume system resources (e.g., network bandwidth and processing cycles) shared by other processes including those that process I/O reads and writes. System performance may be improved by throttling replication data transmissions using a technique referred to herein as "link smoothing."

According to one aspect of the disclosure, a method comprises: determining a number of chunks written to a storage volume during a first replication cycle; determining a host write rate based on the number of chunks written to the storage volume during the first replication cycle; estimating a number of chunks written during a second replication cycle; determining a target rate based on the estimated number of chunks written during the second replication cycle; and transmitting chunks written during the second replication cycle at the target rate.

In some embodiments, the storage volume is storage volume with a content-based storage system. In certain embodiments, determining a number of chunks written to a storage volume during a first replication cycle includes comparing two address-to-hash (A2H) tables associated with consecutive snapshots of the storage volume. In various embodiments, estimating a number of chunks written during a second replication cycle includes multiplying the host write rate based on the first replication cycle by a length of the second replication cycle.

In particular embodiments, wherein determining a target rate based on the estimated number of chunks written during the second replication cycle includes dividing the number of chunks written during the second replication cycle by a recovery point objective (RPO) period. In some embodiments, the RPO period is defined by a user. In certain embodiments, dividing the number of chunks written during the second replication cycle by a RPO period includes scaling the number of chunks written during the second replication cycle.

According to another aspect of the disclosure, a system comprises one or more processors; a volatile memory; and a non-volatile memory storing computer program code that when executed on the processor causes execution across the one or more processors of a process operable to perform embodiments of the method described hereinabove.

According to yet another aspect of the disclosure, a computer program product tangibly embodied in a non-transitory computer-readable medium, the computer-readable medium storing program instructions that are executable to perform embodiments of the method described hereinabove.

BRIEF DESCRIPTION OF THE DRAWINGS

The foregoing features may be more fully understood from the following description of the drawings in which:

FIG. 2 is a diagram of illustrative address-to-hash (A2H) tables that may be used within a storage system, in accordance with embodiments of the disclosure;

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the structures and techniques sought to be protected herein, some terms are explained. As used herein, the term "storage system" may be broadly construed so as to encompass, for example, private or public cloud computing systems for storing data as well as systems for storing data comprising virtual infrastructure and those not comprising virtual infrastructure. As used herein, the terms "host," "client," and "user" may refer to any person, system, or other entity that uses a storage system to read/write data.

As used herein, the terms "disk" and "storage device" may refer to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). The term "storage array" may be used herein to refer to any collection of storage devices. As used herein, the term "memory" may refer to volatile memory used by the storage system, such as dynamic random access memory (DRAM).

As used herein, the terms "I/O read request" and "I/O read" refer to a request to read data. The terms "I/O write request" and "I/O write" refer to a request to write data. The terms "I/O request" and "I/O" refer to a request that may be either an I/O read request or an I/O write request. As used herein, the terms "logical I/O address" and "I/O address" refer to a logical address used by hosts to read/write data from/to a storage system.

While vendor-specific terminology may be used herein to facilitate understanding, it is understood that the concepts, techniques, and structures sought to be protected herein are not limited to use with any specific commercial products.

Figure 1:
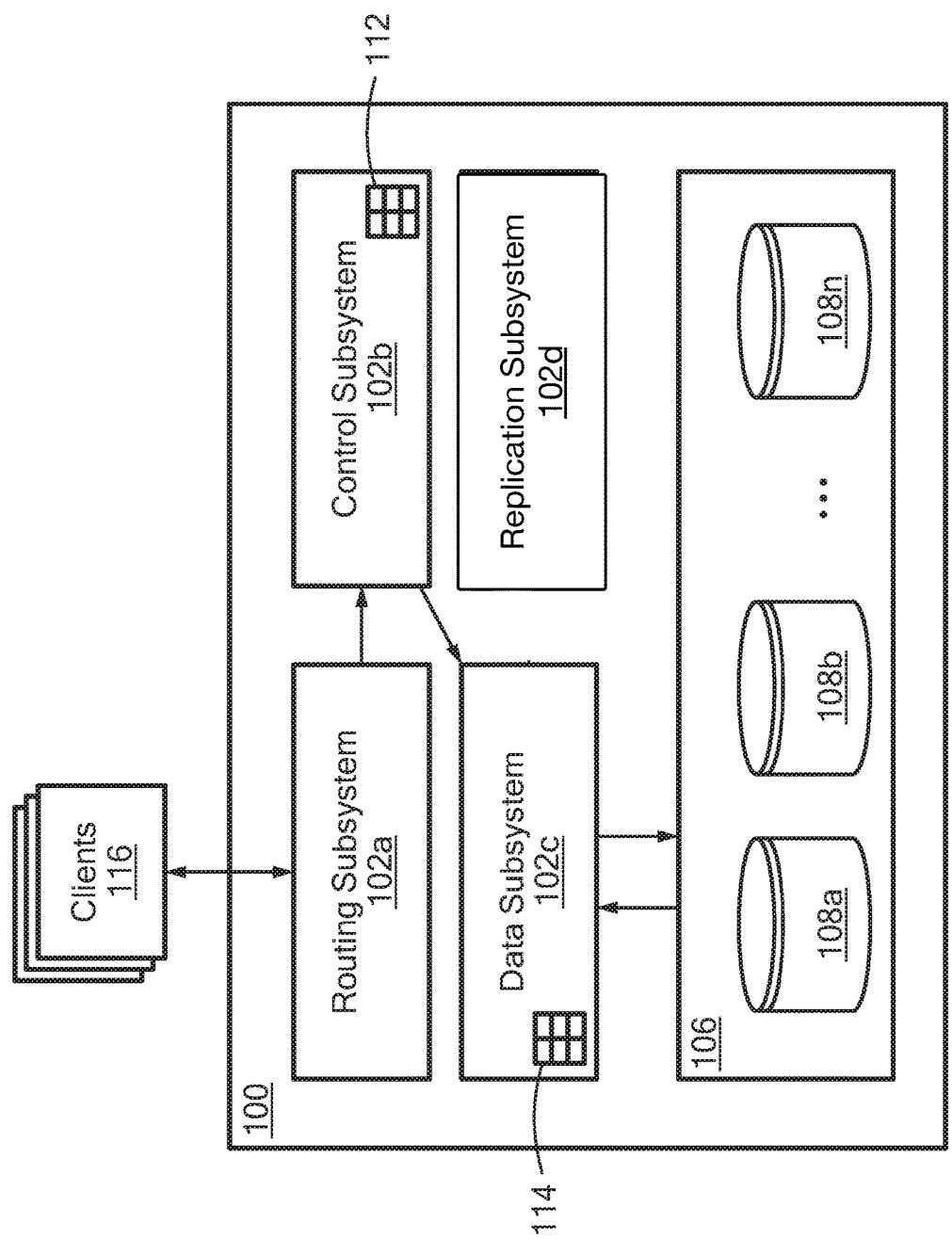
FIG. 1 is a block diagram of a storage system, in accordance with an embodiment of the disclosure.

FIG. 1 shows a storage system 100 according to an illustrative embodiment of the disclosure. The storage system 100 may include a plurality of subsystems (or "processors") 102a-102d (generally denoted 102 herein), and a storage array 106 comprising a plurality of disks 108a . . . 108n (generally denoted 108 herein). In some embodiments, the disks 108 correspond to SSDs. In various embodiments, the storage array 106 is heterogeneous, meaning that the disks 108 may have different storage capacities (or "sizes").

In the embodiment shown, the subsystems 102 include a routing subsystem 102a, a control subsystem 102b, a data subsystem 102c, and a replication subsystem 102d. In one embodiment, the subsystems 102 may be provided as software modules, i.e., computer program code that, when executed on a processor, may cause a computer to perform functionality described herein. In a certain embodiment, the storage system 100 includes an operating system (OS) and one or more of the subsystems 102 may be provided as user space processes executable by the OS. In other embodiments, a subsystem 102 may be provided, at least in part, as hardware such as digital signal processor (DSP) or an application specific integrated circuit (ASIC) configured to perform functionality described herein.

The routing subsystem 102a may be configured to receive I/O requests from clients 116 and to translate client requests into internal commands. Each I/O request may be associated with a particular volume and may include one or more I/O addresses (i.e., logical addresses within that volume). The storage system 100 stores data in fixed-size chunks, for example 4 KB chunks, where each chunk is uniquely identified within the system using a "hash" value that is derived from the data/content stored within the chunk. The routing subsystem 102a may be configured to convert an I/O request for an arbitrary amount of data into one or more internal I/O requests each for a chunk-sized amount of data. The internal I/O requests may be sent to one or more available control subsystems 102b for processing. In some embodiments, the routing subsystem 102a is configured to receive Small Computer System Interface (SCSI) commands from clients. In certain embodiments, I/O requests may include one or more logical block addresses (LBAs).

For example, if a client 116 sends a request to write 8 KB of data starting at logical address zero (0), the routing subsystem 102a may split the data into two 4 KB chunks, generate a first internal I/O request to write 4 KB of data to logical address zero (0), and generate a second internal I/O request to write 4 KB of data to logical address one (1). The routing subsystem 102a may calculate hash values for each chunk of data to be written, and send the hashes to the control subsystem(s) 102b. In one embodiment, chunk hashes are calculated using a Secure Hash Algorithm 1 (SHA-1).

As another example, if a client 116 sends a request to read 8 KB of data starting at logical address one (1), the routing subsystem 102a may generate a first internal I/O request to read 4 KB of data from address zero (0) and a second internal I/O request to read 4 KB of data to address one (1).

The control subsystem 102b may also be configured to clone storage volumes and to generate snapshots of storage volumes using techniques known in the art. For each volume/snapshot, the control subsystem 102b may maintain a so-called "address-to-hash" (A2H) tables 112 that maps I/O addresses to hash values of the data stored at those logical addresses.

The data subsystem 102c may be configured to maintain one or more so-called "hash-to-physical address" (H2P) tables 114 that map chunk hash values to physical storage addresses (e.g., storage locations within the storage array 106 and/or within individual disks 108). Using the H2P tables 114, the data subsystem 102c handles reading/writing chunk data from/to the storage array 106. The H2P table may also include per-chunk metadata such as a compression ratio and a reference count. A chunk compression ratio indicates the size of the compressed chunk stored on disk compared to the uncompressed chunk size. For example, a compression ratio of 0.25 may indicate that the compressed chunk on disk is 25% smaller compared to its original size. A chunk reference count may indicate the number of times that the chunk's hash appears within A2H tables. For example, if the same chunk data is stored at two different logical addresses with the same volume/snapshots (or within two different volumes/snapshots), the H2P table may indicate that the chunk has a reference count of two (2).

It will be appreciated that combinations of the A2H 112 and H2P 114 tables can provide multiple levels of indirection between the logical (or "I/O") address a client 116 uses to access data and the physical address where that data is stored. Among other advantages, this may give the storage system 100 freedom to move data within the storage array 106 without affecting a client's 116 access to that data (e.g., if a disk 108 fails). In some embodiments, an A2H 112 table and/or an H2P 114 table may be stored in memory.

The replication subsystem 102d may be configured to replicate data from the storage system 100 to a remote system (e.g., another storage system). In some embodiments, the replication subsystem 102d may automatically replicate on one or more storage volumes based on defined RPO periods. Within a replication cycle, the replication subsystem 102d may cause a volume snapshot to be generated, determine which data has changed within the volume since the previous replication cycle (e.g., by comparing consecutive snapshots), and transmit the changed data to the remote system. In various embodiments, replication subsystem 102d performs link smoothing to reduce network/processing load within the system 100 during a replication cycle. In certain embodiments, replication subsystem 102d implements at least a portion of the processing described below in conjunction with FIG. 4.

In some embodiments, storage system 100 corresponds to a node within a distributed storage system having a plurality of nodes, each of which may include one or more of the subsystems 102a-102d.

In one embodiment, the system 100 includes features used in EMC® XTREMIO®.

Referring to FIG. 2, within a storage system (e.g., storage system 100 of FIG. 1), storage volumes may be represented using one or more A2H tables. An A2H table includes zero or more entries each having an "Address" value and a corresponding "Hash" value. For a given table entry, the Address value corresponds to an I/O address used by a host to read/write a chunk of data, and the Hash value corresponds to a hash value calculated over the chunk data. To promote clarity in the drawings, hash values are shown as 3-character values (e.g., "abc"). It should be understood that, in practice, hash values may have any suitable length and format suitable. For example, in the case of SHA-1, hash values may be 160-bit values.

A snapshot of a storage volume may be generated by making a copy of the volume's A2H table. The copied table represents the contents of the volume at a particular point in time and, for example, can be used to revert the state of the volume to that point in time. Two A2H tables may be compared to determine which chunks of data within a volume were written (i.e., modified or added) between the respective points in time. For example, referring to the example of FIG. 2, a first A2H table 200 may represent a snapshot taken at a first time, and a second A2H table 202 may represent a snapshot taken at a second, later time. In this example, the chunk data at address "3" was modified, the chunk data at address "1" was deleted, and chunk data was added at addresses "8," "9," and "10." Thus, during replication, it may be necessary to transmit (e.g., to a remote system) the chunk data corresponding to hashes "3," "8," "9," and "10." In some embodiments, a replication subsystem 102d (FIG. 1) is configured to compare two A2H tables by comparing the entries at each logical Address.

Figure 3:
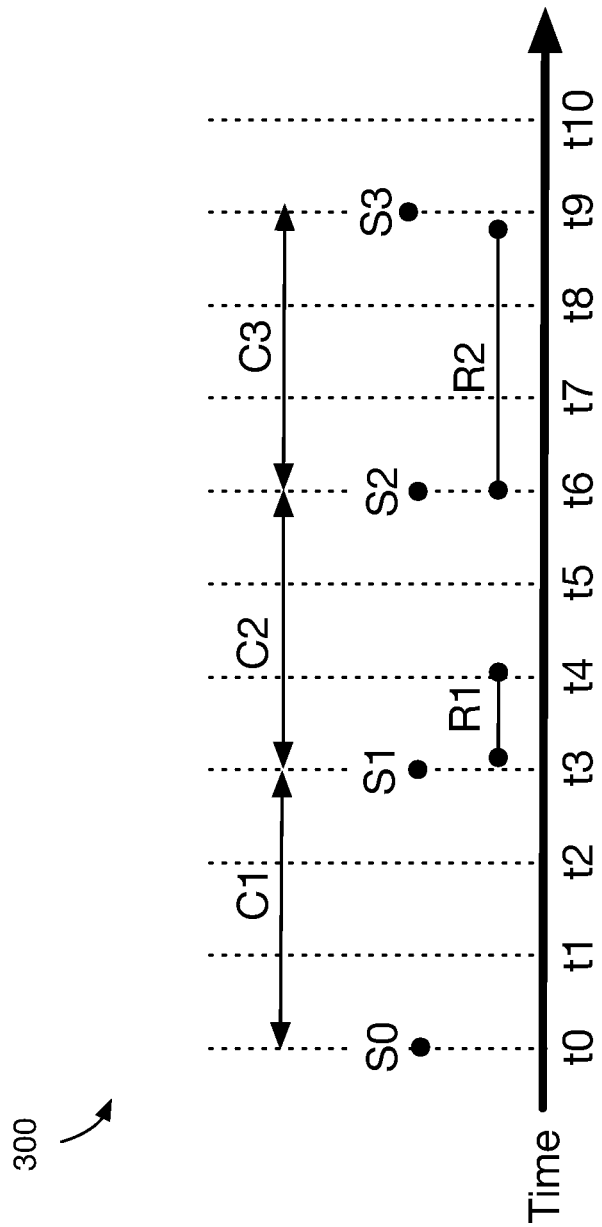
FIG. 3 is a timing diagram showing illustrative replication cycles that may occur within a storage system, in accordance with embodiments of the disclosure.

FIG. 3 shows a timing diagram 300 illustrating events that may occur within a storage system (e.g. content-based storage system 100 of FIG. 1). In this example, the storage system periodically replicates a storage volume based on an RPO period of three (3) time units. Between times t0 and t3, one or more I/O writes may be received for the storage volume. This time period is referred to herein as a first replication cycle C1. At time t3, a snapshot S1 is automatically generated according to the RPO period.

The point in time (t3) when snapshot S1 is generated is treated as the start of a second replication cycle C2. After S1 is generated, a first replication process R1 commences to determine which chunks associated with the volume were written during C1 and to transmit those chunks to a remote system. In some embodiments, this includes comparing A2H tables associated with snapshot S1 and a previous snapshot S0 to determine the chunks written during C1. The replication processes (e.g., R1) may be performed by a replication subsystem 102d (FIG. 1).

The first replication process R1 may take an indeterminate of time to complete based, for example, the number of chunks that were written during C1. The first replication process R1 may attempt to transmit chunk data as fast as possible over an available network link. As a result, process R1 may complete well before the end of the second replication cycle C2, resulting in a period where a replication process is busy sending data, followed by another period where no data is sent while waiting for the next replication cycle. For example, as shown in FIG. 3, a large amount of data may be transmitted between times t3 and t4, whereas relatively little data (or no data) may be transmitted between times t4 and t6.

In various embodiments, the storage system may use statistical information from one or more previous replication cycles to distribute the transmissions evenly over a subsequent replication cycle. For example, during a third replication cycle C3, which begins with the generation of a snapshot S2 at time t6, the storage system may use information about the number of chunks written during cycle C1 to spread the transmission of chunk data in replication process R2 across the third replication cycle C3. As shown in FIG. 3, the replication process R2 may run for substantially the entire duration of replication cycle C3, even if the chunks written during the cycle C2 could be transmitted in less time.

In some embodiments, the storage system performs link smoothing based on the assumption that I/O patterns remain fairly constant between cycles. In particular, replication process R2 may estimate the number of chunks to be sent during replication cycle C3 (i.e., the number of chunks written during cycle C2) based on the actual number of chunks written during C1 (which may be determined as part of replication process R2) and use this information to perform link smoothing.

Figure 4:
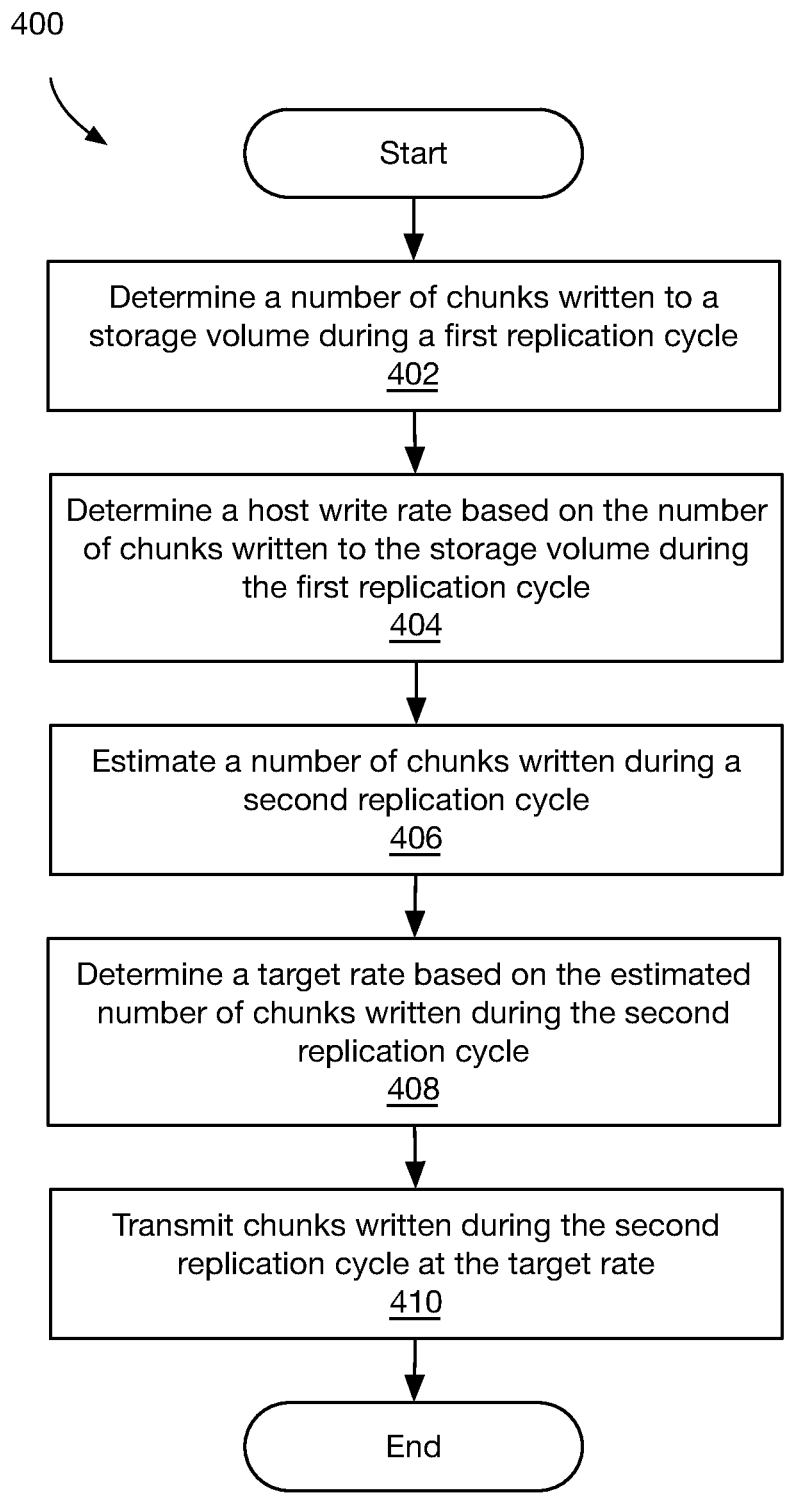
FIG. 4 is a flow diagram showing processing that may be implemented within a storage system, in accordance with embodiments of the disclosure.

FIG. 4 is a flow diagram showing illustrative processing that can be implemented within a storage system (e.g., content-based storage system 100 of FIG. 1). Rectangular elements (typified by element 402) herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order. In some embodiments, the processing blocks represent states and transitions, respectively, within a finite-state machine, which can be implemented in software and/or hardware.

Referring to FIG. 4, a method 400, begins at block 402, where a number of chunks written to a storage volume during a first replication cycle is determined. In some embodiments, the number of chunks written is determined by scanning and comparing two A2H tables associated with consecutive snapshots. For example, referring to FIG. 3, the number of chunks written during cycle C1 may be determined by replication process R1 by comparing the A2H tables associated with snapshots S0 and S1.

At block 404, a host write rate is determined based on the number of chunks written to the storage volume during the first replication cycle. In some embodiments, the host rate may be calculated as the number of chunks written to the storage volume during the first replication cycle divided by the length of the first replication cycle.

At block 406, an estimate is made of a number of chunks written to the storage volume during a second replication cycle. In many embodiments, the estimate is made based on the assumption that the host write rate is generally invariant between consecutive replication cycles. Thus, the number of chunks written during the second replication cycle may be calculated by multiplying the host write rate calculated based on the first replication cycle by the length of the second replication cycle. It should be appreciated that the length of the second replication cycle may be different from the RPO period (e.g., replication could take longer than the RPO period due to a high number of I/O writes).

At block 408, a target rate to transmit chunks is determined based on the estimated number of chunks written during the second replication cycle. In some embodiments, the target rate may be calculated by dividing the estimated number of chunks written during a second replication cycle by the RPO period. In certain embodiments, the target rate may be calculated with the goal of having the replication process take less time than the RPO period. For example, the estimated number of chunks written during the second replication cycle may be increased (e.g., scaled by a value greater than one) prior to being divided by the RPO period.

At block 410, chunks written during the second replication cycle are transmitted (e.g., to a remote content-based storage system) at the target rate. For example, chunk transmissions may be artificially delayed or throttled to achieve the target rate.

In some embodiments, the method 400 may be performed at (or near) the start of the third replication cycle. Thus, the method 400 may provide link smoothing using statistical information from two (2) previous replication cycles.

Figure 5:
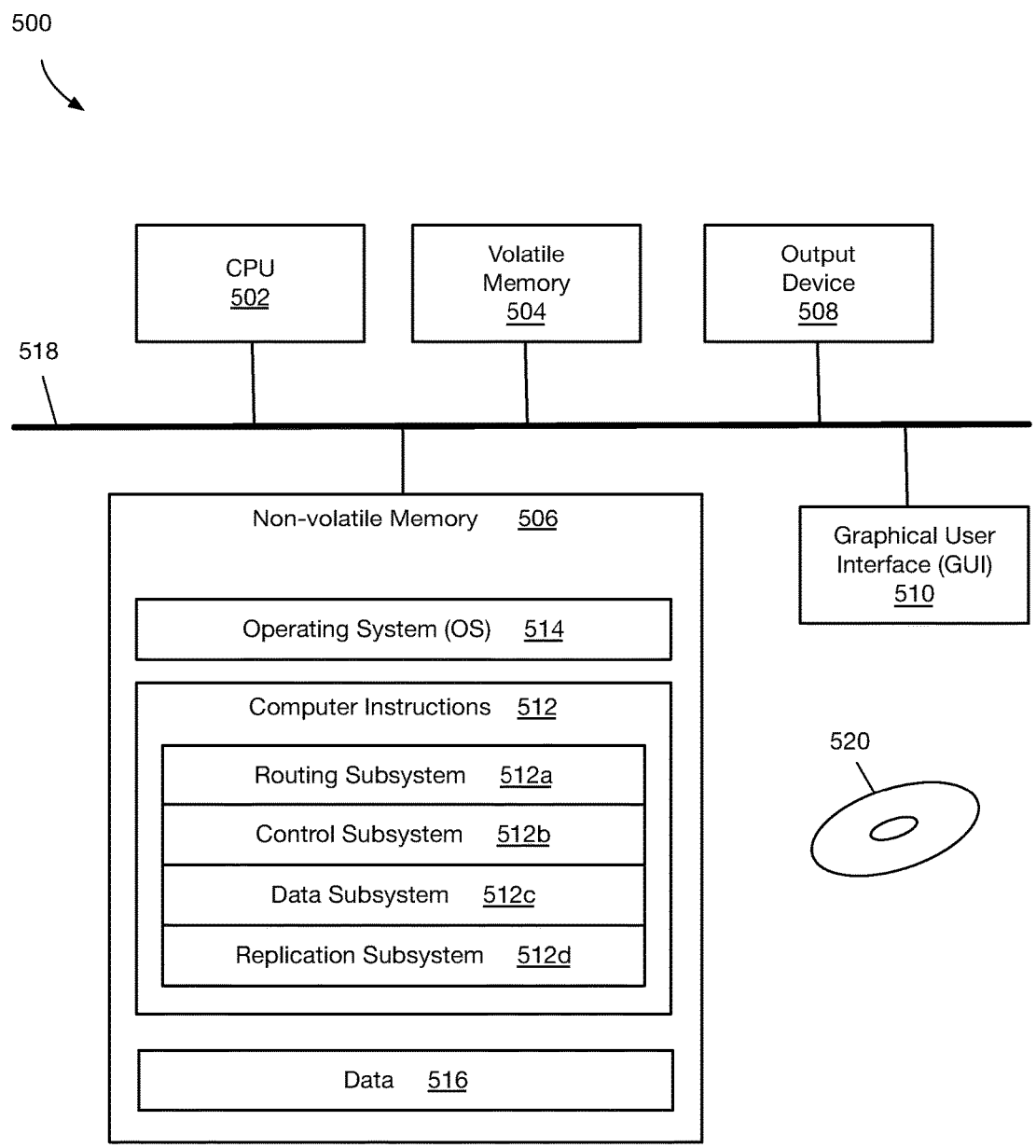
FIG. 5 is a schematic representation of an illustrative computer, in accordance with an embodiment of the disclosure.

FIG. 5 shows an illustrative computer (e.g., physical or virtual) or other processing device 500 that can perform at least part of the processing described herein. In some embodiments, the computer 500 forms a part of a storage system, such as storage system 100 of FIG. 1. The computer 500 may include a processor 502, a volatile memory 504, a non-volatile memory 506 (e.g., hard disk or SSD), an output device 508 and a graphical user interface (GUI) 510 (e.g., a mouse, a keyboard, a display, for example), each of which is coupled together by a bus 518. The non-volatile memory 506 is configured to store computer instructions 512, an operating system 514, and data 516. In one embodiment, the computer instructions 512 are executed by the processor 502 out of volatile memory 504. In some embodiments, an article 520 comprises non-transitory computer-readable instructions.

In the embodiment shown, computer instructions 512 may include routing subsystem instructions 512a that may correspond to an implementation of a routing subsystem 102a (FIG. 1), control subsystem instructions 512b that may correspond to an implementation of a control subsystem 102b, data subsystem instructions 512c that may correspond to an implementation of a data subsystem 102c, and replication subsystem instructions 512d that may correspond to an implementation of a replication subsystem 102d.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A method comprising:
   determining a number of chunks written to a storage volume during a first replication cycle;
   determining a host write rate based on the number of chunks written to the storage volume during the first replication cycle;
   estimating a number of chunks written during a second replication cycle;
   determining a target rate based on the estimated number of chunks written during the second replication cycle, the target rate determined by dividing the number of chunks written during the second replication cycle by a recovery point objective (RPO) period; and
   transmitting chunks written during the second replication cycle at the target rate.

2. The method of claim 1 wherein the storage volume is storage volume with a content-based storage system.

3. The method of claim 1 wherein determining a number of chunks written to a storage volume during a first replication cycle includes comparing two address-to-hash (A2H) tables associated with consecutive snapshots of the storage volume.

4. The method of claim 1 wherein estimating a number of chunks written during a second replication cycle includes multiplying the host write rate based on the first replication cycle by a length of the second replication cycle.

5. The method of claim 1 wherein the RPO period is defined by a user.

6. The method of claim 1 wherein dividing the number of chunks written during the second replication cycle by a RPO period includes scaling the number of chunks written during the second replication cycle.

7. The method of claim 6, wherein the scaling includes increasing the estimated number of chunks written prior to dividing the estimated number of chunks written by the RPO period, such that the transmitting the chunks written at the target rate occurs within the RPO period.

8. A system comprising:
   a processor;

a volatile memory; and a non-volatile memory storing computer program code that when executed on the processor causes the processor to execute a process operable to:

determine a number of chunks written to a storage volume during a first replication cycle;

determine a host write rate based on the number of chunks written to the storage volume during the first replication cycle;

estimate a number of chunks written during a second replication cycle;

determine a target rate based on the estimated number of chunks written during the second replication cycle, the target rate determined by dividing the number of chunks written during the second replication cycle by a recovery point objective (RPO) period; and transmit chunks written during the second replication cycle at the target rate.

9. The system of claim 8 wherein the storage volume is storage volume with a content-based storage system.

10. The system of claim 8 wherein determining a number of chunks written to a storage volume during a first replication cycle includes comparing two address-to-hash (A2H) tables associated with consecutive snapshots of the storage volume.

11. The system of claim 8 wherein estimating a number of chunks written during a second replication cycle includes multiplying the host write rate based on the first replication cycle by a length of the second replication cycle.

12. The system of claim 8 wherein the RPO period is defined by a user.

13. The system of claim 8 wherein dividing the number of chunks written during the second replication cycle by a RPO period includes scaling the number of chunks written during the second replication cycle.

14. A computer program product tangibly embodied in a non-transitory computer-readable medium, the computer-readable medium storing program instructions that are executable to:

determine a number of chunks written to a storage volume during a first replication cycle;

determine a host write rate based on the number of chunks written to the storage volume during the first replication cycle;

estimate a number of chunks written during a second replication cycle;

determine a target rate based on the estimated number of chunks written during the second replication cycle, the target rate determined by dividing the number of chunks written during the second replication cycle by a recovery point objective (RPO) period; and transmit chunks written during the second replication cycle at the target rate.

15. The computer program product of claim 14 wherein the storage volume is storage volume with a content-based storage system.

16. The computer program product of claim 14 wherein determining a number of chunks written to a storage volume during a first replication cycle includes comparing two address-to-hash (A2H) tables associated with consecutive snapshots of the storage volume.

17. The computer program product of claim 14 wherein estimating a number of chunks written during a second replication cycle includes multiplying the host write rate based on the first replication cycle by a length of the second replication cycle.

18. The computer program product of claim 14 wherein the RPO period is defined by a user.

19. The computer program product of claim 14 wherein dividing the number of chunks written during the second replication cycle by a RPO period includes scaling the number of chunks written during the second replication cycle.

* * * * *